United States Patent
Miyake et al.

[11] Patent Number: 6,163,600
[45] Date of Patent: *Dec. 19, 2000

[54] COMMUNICATION APPARATUS USING TELEPHONE LINE

[75] Inventors: Hideki Miyake, Nara; Tsutomu Sakata, Suita; Shigekazu Fujiwara, Yamatokoriyama, all of Japan

[73] Assignee: Sharp Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/758,309

[22] Filed: Dec. 3, 1996

[30] Foreign Application Priority Data

Dec. 5, 1995 [JP] Japan ................................. 7-316968

[51] Int. Cl.$^7$ ........................... H04M 11/00; H04N 1/32
[52] U.S. Cl. ........................... 379/100.15; 379/100.09; 358/468
[58] Field of Search ........................... 379/93.05, 93.09, 379/93.11, 93.14, 93.26–93.29, 100.01, 100.02, 100.09, 100.14–100.17, 100.06; 358/400, 434, 442–443, 468

[56] References Cited

U.S. PATENT DOCUMENTS

| | | | |
|---|---|---|---|
| 3,885,108 | 5/1975 | Zock | 379/93.28 |
| 4,113,992 | 9/1978 | Gorham et al. | 379/100.14 |
| 4,901,343 | 2/1990 | Yamaguchi | 379/100.15 |
| 4,910,764 | 3/1990 | Bowen | 379/100.01 |
| 5,022,071 | 6/1991 | Mozer et al. | 379/100.06 |
| 5,127,046 | 6/1992 | Malm | 379/93.05 |
| 5,444,770 | 8/1995 | Davis et al. | 379/93.09 |
| 5,481,373 | 1/1996 | Ikeguchi et al. | 379/100.16 |
| 5,499,287 | 3/1996 | Campbell et al. | 379/93.11 |
| 5,502,760 | 3/1996 | Gilbert et al. | 379/93.05 |
| 5,610,975 | 3/1997 | Tsuchida | 379/100.15 |

FOREIGN PATENT DOCUMENTS

| | | |
|---|---|---|
| 0 448 312 A2 | 9/1991 | European Pat. Off. . |
| 0 490 261 A2 | 6/1992 | European Pat. Off. . |
| 6-62168 | 7/1992 | Japan . |
| 2 225 193 | 5/1990 | United Kingdom . |

*Primary Examiner*—Curtis A. Kuntz
*Assistant Examiner*—George Eng
*Attorney, Agent, or Firm*—Nixon & Vanderhye, P.C.

[57] ABSTRACT

An object of the invention is to provide a communication apparatus which commonly uses a function circuit required both for a voice communication and an image communication so that the number of parts of the apparatus is reduced and the apparatus is realized at a low cost; therefore the communication apparatus 1 using a telephone line according to the invention includes a speech circuit 6 for use in a telephone set, wherein the speech circuit 6 is connected to the telephone line for selectively transmitting and receiving a voice signal and an image signal via the telephone line and responds to an output of an operation panel 7 for instructing a start of transmitting the voice signal and the image signal so that the telephone line L is closed by controlling a circuit control circuit 3 for closing and opening the telephone line thereby separating a modem 11 connected to the circuit control circuit 3 for transmitting and receiving an image signal via the telephone line L upon an instruction being given to start transmitting the voice signal while the telephone line L is closed by controlling the circuit control circuit 3 thereby separating a handset 4 connected to the circuit control circuit 3 for transmitting and receiving the voice signal via the telephone line upon an instruction being given to start transmitting an image signal.

31 Claims, 4 Drawing Sheets

COMMUNICATION APPARATUS USING TELEPHONE LINE

BACKGROUND OF THE INVENTION

1. Field of the Invention

The present invention relates to communication apparatuses for carrying out a communication via a telephone line, and more particularly to communication-apparatus using the telephone line, wherein particularly a telephone voice communication function and a facsimile function of transmitting and receiving an image signal carried out by changing over the respective functions.

2. Description of the Related Art

Most of facsimile machines which are currently prevalent are constructed so that a telephone function and a facsimile function are carried out by switching. In such facsimile machines, a telephone function circuit and a facsimile function circuit are individually provided to realize the aforementioned two functions, and a telephone line is selectively connected to either of the two function circuits by using a change-over circuit which is realized in a relay or the like thereby carrying out each kind of communication.

Normally, telephone sets with no facsimile function are designed so that the telephone sets can be operated only with a current supply from the telephone line. These normal telephone sets are generally constructed in such a manner that a dialer IC (Integrated Circuit) is used for originating a dial call while a ringer IC is used as an incoming call detector, respectively. Consequently, facsimile machines attached with the telephone function are generally designed so that the above telephone (circuit) is simply added to the facsimile function circuit.

At the time when the telephone call is made, the telephone line is connected to the telephone function circuit to carry out a call originating operation, an incoming call receiving operation and a telephone call operation. At the time of a facsimile communication, the telephone line is connected to the facsimile function circuit to carry out the call originating operation, the call receiving operation and an operation of transmitting and receiving an image signal. Since the two function circuits carry out individually a processing for the communication in this manner, it is required that each of the two circuits satisfies a predetermined Circuit Connection Technical Standard. Consequently, both the telephone function circuit and the facsimile function circuit are required for the communication and individually have the same function circuit which satisfies the Circuit Connection Technical Standard. For example, the same function circuits are provided with a pair of dial call originating circuits, incoming call detectors, circuit controllers, direct current superimposing circuits, and termination circuits. The duplication of circuitry leads to a high cost.

The Circuit Connection Technical Standard is individually set in each country so that dealers who wish to sell communication apparatuses are required to undergo a test in each of the countries to see if they can satisfy the standard. The dealers are required to pass the test and obtain an authorization for selling the apparatuses. In the case of Japan, the standard is set by the Telecommunication Terminal Examination Association. The specification content of the standard differs from one country to another. In addition, although the voice communication circuit side and the facsimile communication circuit side are common in terms of the basic specification contents such as, for example, a direct current resistor, an impedance, a dial specification, and an incoming call detection sensitivity, original specification items are respectively included for different parts at the same time.

For example, when an attempt is made to commonly use a dial call originating circuit, it happens that a telephone call can be made by using a modem used in the facsimile communication, but a dial tone cannot be confirmed with a telephone receiver. In addition, in some countries, it is technically impossible to make a telephone call by using a modem because it is provided in the Standard that the telephone receiver shall be operated with a supply of currents from a telephone line, in the event of power failures. Furthermore, with respect to the incoming call detector, it is also technically impossible to provide the incoming call detector in some other countries because it is provided in the Standard in the countries that the detectors shall be operated with a current supply from the telephone line in case of power failures.

In addition, a termination circuit (termination resistor) serves as an impedance as seen from the side of the telephone line. Signals can be transmitted with the least loss by integrating the termination circuit with an output impedance of the telephone line. Consequently, in the Circuit Connection Technical Standard in each country it is provided that the termination circuit shall be defined as an "impedance". Conventionally, the telephone function circuit and the facsimile function circuit are provided with the termination circuit, respectively. The termination circuit in the telephone function circuit incorporates a resistor and a capacitor in the primary side of the circuit. On the other hand, the termination circuit in the facsimile function circuit incorporates a resistor and a capacitor in the secondary side of the circuit via a communication transformer.

Furthermore, the facsimile machines attached with the telephone function are constructed so that a dialer IC which serves as a call originating means for a voice communication (telephone communication) is incorporated in the telephone function circuit with the result that the telephone call can be originated from the dialer IC at the time of the facsimile communication as well.

On the other hand, a facsimile machine which is exclusively used for the facsimile communication and which is not attached with the telephone function is constituted so that the dialer IC is not used. As a result, that a signal is transmitted either with a dial pulse generated from a dial pulse generator comprising a transistor and a photocoupler or with a DTMF (Dual Tone Modulation Frequency) signal from the modem.

The dialer IC is required to be provided in the telephone line of the facsimile machine attached with the telephone function. This requirement results from a problem with the voice communication circuit and the facsimile communication circuit whereby the circuit control means and the direct current superimposing circuit are independent of each other in the voice communication circuit and the facsimile communication circuit. Thus, the dial tone cannot be confirmed on the side of the telephone set when the telephone call is made with the DTMF signal from the modem in the state in which the circuit is closed with the facsimile communication circuit like in the case of the facsimile machines exclusively used for the facsimile communication.

As a technology for solving the aforementioned problem, there is available a facsimile machine described in the Japanese Unexamined Patent Publication JP-A 6-62168. This facsimile machine is designed so that an incoming call and an outgoing call path of the telephone line is changed over at the time of the voice communication and at the time of the facsimile communication. However, there arises in this arrangement a problem in that when a line length compensating circuit is provided in the telephone function, a transmitting and a receiving signal in the facsimile communication depends on a circuit current and changes with the current so that the receiving characteristics of an image signal does not become stable.

Normally, the line length compensation is a function which is incorporated in a speech IC for use in the telephone set, the IC constituting the telephone function circuit. The line length compensation is also a function of changing with the circuit current an amplifier gain in the incoming call and the outgoing call path in the telephone line, that is, between an input from a microphone and an output from the circuit and an output from the circuit and an input from the microphone. Generally, in the Circuit Connection Standard for Telephones, this function is required. On the other hand, it is desired in the Circuit Connection Standard for Facsimile Machines that the amplifier gain is fixed.

SUMMARY OF THE INVENTION

An object of the invention is to provide a communication apparatus using a telephone line wherein a function circuit required for a voice communication and an image communication respectively is commonly used for both types of communication so that the number of parts is reduced and the apparatus can be realized at a low cost.

The invention provides a communication apparatus using a telephone line for selectively transmitting and receiving a voice signal and an image signal via the telephone line, the communication apparatus comprising:

circuit control means for closing and opening the telephone line;

voice signal communication means connected to the circuit control means, for transmitting and receiving a voice signal via the telephone line;

image signal communication means connected to the circuit control means, for transmitting and receiving an image signal via the telephone line;

transmission instruction means for instructing a start of transmitting either the voice signal or the image signal;

a controller which responds to an output of the transmission instruction means, and controls the circuit control means to close the telephone line and isolate the image signal communication means, when an instruction to start transmitting the voice signal is given, or to close the telephone line and isolate the voice signal communication means, when an instruction to start transmitting the image signal is given.

According to the invention, the telephone line is closed by the single circuit control means in either case where an instruction to transmit the voice signal is given, or where an instruction to transmit the image signal is given, and thereby a circuit between an exchanger and the communication apparatus is established. The start of transmission of the voice signal is instructed, for example, when a user picks up a handset for the communication or the user presses an on-hook key. The start of transmission of the image signal is instructed, for example, when the user sets a document to be read on a scanner, inputs a telephone number of a destination to which the document is addressed and presses a start button. The circuit control means comprises, for example, a speech circuit for conducting a direct current superimposition and a switching circuit for connecting the telephone line to the speech circuit or for interrupting the connection of the telephone line with the speech circuit.

In such an arrangement, when the instruction to start transmitting the voice signal is given, the image signal communication means is isolated from the circuit control means. On the other hand, when the instruction to start transmitting the image signal is given, the voice signal communication means is isolated from the circuit control means. After that, either the voice signal or the image signal is transmitted and received with the communication means connected to the circuit control means.

Furthermore, the invention is characterized in that:

the voice signal communication means includes a line length compensating circuit;

the image signal communication means is connected to the circuit control means via a termination resistor; and the controller isolates the image signal communication means from the termination resistor when an instruction to start transmitting the voice signal is given.

According to the invention, the termination resistor is disposed between the circuit control means and the image signal communication means. At the time of the voice communication, the image signal communication means is isolated from the termination resistor so that only the termination resistor is connected to the telephone line to serve as a termination resistor in the voice signal communication. In addition, the voice signal communication means amplifies the voice signal at an optimal amplification rate corresponding to a line length between the exchanger and the facsimile machine so that a favorable telephone call can be made. At the time of the image signal communication, the image signal communication means is connected via the termination resistor so that the termination resistor serves as the termination resistor in the image signal communication. In addition, since the voice signal communication means is isolated from the circuit control means, the line length is not compensated.

Furthermore, the invention is characterized in that a dial pulse generating means for generating a dial pulse is connected to the circuit control means.

According to the invention, after the circuit is established by the circuit control means, a dial pulse from the dial pulse generating means is transmitted to the exchanger via a telephone line to carry out a call originating operation. As described above, since the circuit control means establishes a circuit in both cases of the voice signal communication and the image signal communication, whether the voice signal communication or the image signal communication, it is possible to carry out the call originating operation by means of a dial pulse with one circuit. Additionally, since the image signal communication means includes a modem, the call originating operation can be carried out by means of a DTMF signal outputted by the modem.

Furthermore, the invention is characterized in that the apparatus comprises:

calling signal detecting means connected to the circuit control means, for detecting a calling signal from the exchanger, and calling tone generating means for generating a predetermined calling tone; and the controller drives the calling tone generating means in response to a detection signal of the calling signal detecting means to generate the calling tone.

According to the invention, when the calling tone from the exchanger is detected with the calling tone detecting means, the controller drives the calling tone generating means to generate the predetermined calling tone to notify the user of the arrival of the signal. Since the calling tone transmitted from the exchanger is the same in both the voice signal communication and the image signal communication, the so-called incoming signal detector can be commonly used.

Furthermore, the invention is characterized in that the isolation of the image signal communication means and the voice signal communication means from the telephone line is conducted by using photocoupling means.

According to the invention, either the voice signal communication means or the image signal communication means is isolated from the telephone line by controlling the conduction and nonconduction of the photocoupling means realized, for example, by a photocoupler. In this manner, the circuit can be changed over with a relatively simple structure, and the apparatus can be constructed at a low cost.

Furthermore, the invention is characterized in that:

the communication apparatus further comprises a microphone for converting a voice into a voice signal to output the signal to the telephone line, a speaker for converting the voice signal from the telephone line into a voice, and photocoupling means for connecting the microphone and the speaker to the telephone line or isolating the microphone and the speaker from the telephone line;

the voice signal communication means is driven by using a direct current supplied from the telephone line as a power source; and the controller controls the conduction and nonconduction of the photocoupling means.

According to the invention, the controller can isolate the voice signal communication means from the telephone line in the state in which the controller is electrically insulated with the voice signal communication means by controlling the conduction and nonconduction of the photocoupling means which is realized, for example, with the photocoupler. The voice signal communication means is driven with a direct current from the telephone line. Although the voice signal communication means is driven with the direct current from the telephone line and the controller is driven with a different power source, the voice signal communication means can be connected and isolated without exerting an electric influence on each other by using the photocoupling means with the result that the operation will be improved in reliability.

As described above, according to the invention, whether the voice signal communication or the image signal communication is carried out, the circuit can be established and trapped with a single circuit control means. As a consequence the apparatus requires only one circuit which satisfies the predetermined Circuit Connection Technical Standard sufficiently, and reduction in cost and size can be realized in the communication apparatus.

Furthermore, according to the invention, one and the same terminal resistor is used whether either of the voice signal communication or the image signal communication is carried out, and accordingly the communication apparatus requires only one circuit which satisfies the predetermined Circuit Connection Technical Standard. As a consequence, reduction in cost and size can be realized in the communication apparatus. Besides, since the line length compensation function can be carried out only at the time of the voice signal communication, the voice signal communication and the image signal communication can be favorably conducted.

Furthermore, according to the invention, when any of the voice signal communication or the image signal communication is carried out, the call originating operation can be carried out with one dial pulse calling means. Consequently, it is not necessary to provide the dialer IC which is used in the prior art and the circuit can be commonly used. Consequently, the cost is reduced and the size of the communication apparatus can be reduced as well.

Furthermore, according to the invention, whether the voice signal communication or the image signal communication is carried out, the call can be made with a common circuit. Thus, it is not necessary to provide a ringer IC or a buzzer circuit for use in a ringer as seen in the prior art with the result that the cost thereof is reduced and an attempt can be made to reduce the size of the communication apparatus.

Furthermore, according to the invention, the start-up of the circuit and the termination of the function can be changed over with a simple structure, and the communication apparatus can be realized at a low cost.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
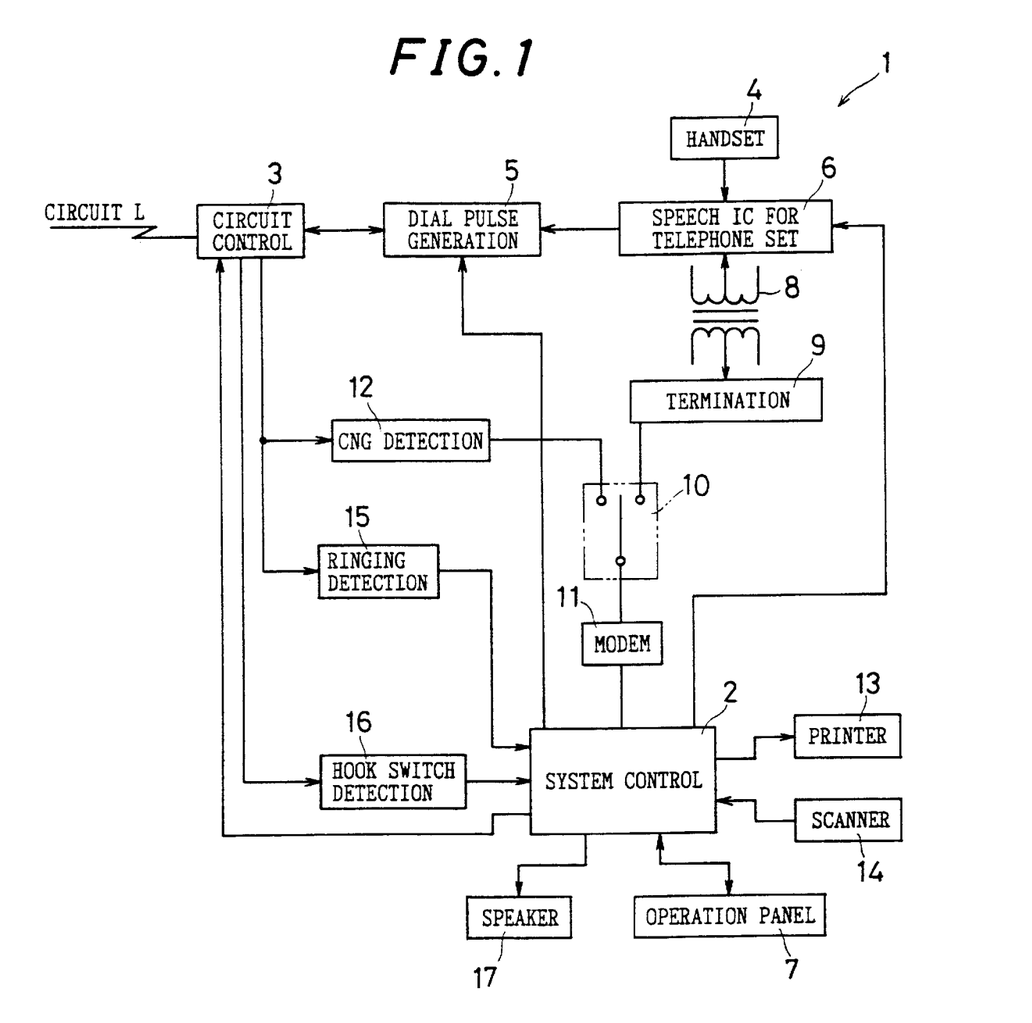
FIG. 1 is a block diagram showing an electrical structure of a communication apparatus 1 using a telephone line of an embodiment of the invention.

FIG. 1 is a block diagram showing an electrical structure of a communication apparatus 1 using a telephone line (hereinafter simply referred to as a "communication apparatus") of an embodiment of the invention. The communication apparatus 1 selectively carries out a voice signal communication (which is sometimes referred to as a "speech") and an image signal communication (which is sometimes referred to as a "facsimile communication") via a telephone line (which is sometimes simply referred to as a "circuit") L.

A system control circuit 2 is realized by using a CPU (Central Processing Unit) or the like. The system control circuit 2 carries out a predetermined operation by controlling a circuit which will be described later. A circuit L is connected to the circuit control circuit 3. The circuit control circuit 3 comprises a relay having one terminal connected to the circuit L, and a hook switch which is conducted and cut off with a transmitting and receiving device 4 which will be described later so that an exchanger (not shown) which is connected to the communication apparatus via the circuit L is started up or restored on the basis of a control signal of the system control circuit 2.

To the circuit control circuit 3, a speech circuit (IC) 6 for use in a telephone set is connected via a dial pulse generator 5. In detail, the speech circuit (IC) 6 is connected to the other terminal of the relay incorporated in the circuit control circuit 3. The dial pulse generator 5 transmits a dial pulse to the circuit L as a signal (selection signal) for the selection of a telephone number of a target person to whom the telephone call is addressed on the basis of a control signal from a system control circuit 2. The dial pulse generator 5 is provided with a dial pulse switch connected in series to the circuit L so that the circuit L is closed with the circuit control circuit 3. Thus, when a direct current is supplied from the exchanger, the direct current is interrupted by bringing this dial pulse switch into conduction/out of conduction, thereby generating an interrupted current (dial pulse). The telephone number is input with the operation of an operation panel 7 connected to the system control circuit 2 by the user.

The speech circuit 6 for use in the telephone set constitutes voice signal communication means and serves as a speech network IC (integrated circuit) for speaking via the handset 4. In the speech circuit 6, a direct current is superimposed and two-line/ four-line conversion is carried out between the circuit L and the handset 4. The handset 4 connected to the speech circuit 6 for use in the telephone set incorporates a microphone and a speaker for speech.

In addition, a modem 11 is connected to the speech circuit 6 for use in the telephone set via a communication transformer 8, a termination circuit 9 and a change-over switch 10. The primary side of the communication transformer 8 is connected to the circuit L while the secondary side thereof is connected to the modem 11 via the termination circuit 9 and the change-over switch 10. The communication transformer 8 is provided for carrying out a data exchange between the circuit L and the modem 11 in an insulation state. Preferably, the speech circuit 6 for use in the telephone set comprises a line length compensating circuit for amplifying the voice signal which is to be transmitted or to be received. Specifically, the line length compensating circuit changes with a circuit current an amplifier gain in the outgoing call and incoming call paths, namely from the point of a microphone input to the point of a circuit output, and from the point of the circuit input to the point of the speaker output. As a consequence, the voice signal can be amplified at an optimal amplification rate, thereby making it possible for the user to speak in good communication conditions.

The termination circuit 9 comprises a resistor and a capacitor. The termination circuit 9 constitutes a termination resistor which is required in accordance with the Circuit Connection Technical Standard at the time of the voice signal communication and in the image signal communication. The termination circuit 9 is kept in the state of being constantly connected via the communication transformer 8 at the time when the circuit is closed. The change-over switch 10 changes over a signal path for connecting the circuit L to the modem 11 in response to a change-over signal from the system control circuit 2. There are two signal paths provided therein. One is a path which passes through the circuit control circuit 3, the dial pulse generator 5, the communication transformer 8 and the termination circuit 9 while the other is a path which passes through the circuit control circuit 3 and a CNG detector 12.

The modem 11 constitutes an image signal communication means which demodulates an image signal which is received via the circuit L to give the signal to the system control circuit 2. The modem 11 modulates an image signal provided by the system control circuit 2 and transmits the signal to the circuit L. Then, the modem 11 transmits each kind of procedure signal in the communication control procedure of the image signal. The received image signal is given to the printer 13 and is recorded on a record paper. The image signal to be transmitted can be given to the system control circuit 2 by reading with a scanner 14 the document thereof to be transmitted and converting the signal into an image signal.

The CNG detector 12 is connected to a circuit control circuit 3 to detect a calling tone (CNG) signal from the circuit L and to give the detected signal to the modem 11 via the change-over switch 10.

Furthermore, a ringing detector 15 and a hook switch detector 16 are connected to the circuit control circuit 3. The ringing detector 15 detects a calling signal from the circuit L and gives the detected signal to the system control circuit 2. The hook switch detector 16 detects whether the handset 4 is picked up and the hook switch is turned on or not thereby giving the detected signal to the system control circuit 2.

The speaker 17 is connected to the system control circuit 2 so that the signal from the system control circuit 2 is converted into a voice to be output therefrom. The system control circuit 2 provides a sequence signal from the modem 11 to the speaker 17 so that the user can monitor the communication sequence voice at the time of the image signal communication. In addition, the system control circuit 2 drives the speaker 17 in response to the detected signal from the ringing detector 15 to generate a predetermined ringing voice.

The operation panel 7 provides ten keys for a dial operation, each kind of operation keys and an indicator so that the user carries out each kind of operation and an operation state of the communication apparatus 1 is indicated.

Figure 2:
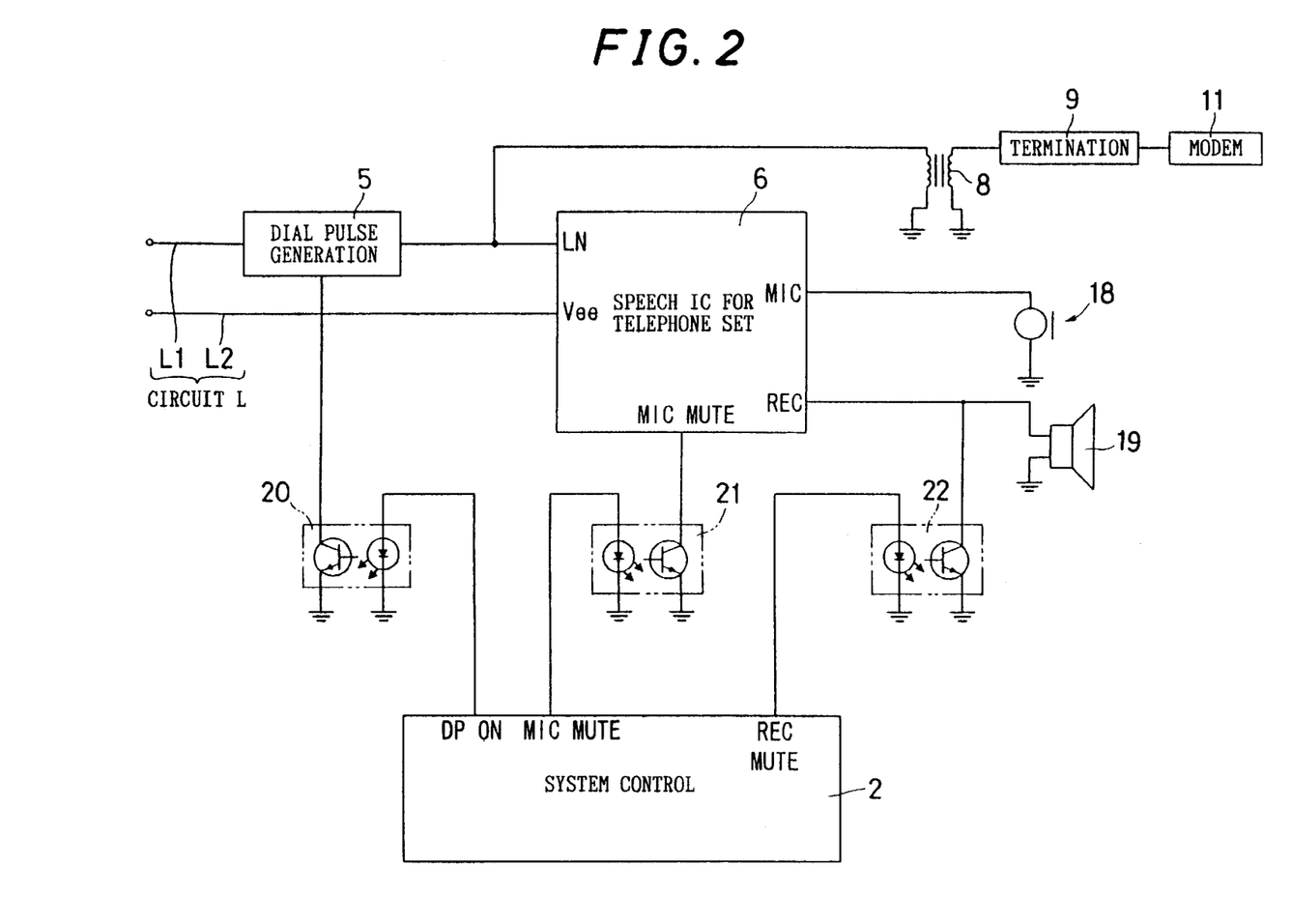
FIG. 2 is a circuit diagram showing an example of a specific structure with respect to a speech circuit 6 for use in a telephone set.

FIG. 2 is a circuit diagram showing an example of a specific structure with respect to the speech circuit 6 for use in the telephone set. In detail, the circuit L comprises two lines L1 and L2. The line L1 is connected to a signal I/O terminal LN of the speech circuit 6 for use in the telephone set via the dial pulse generator 5 while the line L2 is connected to a ground terminal Vee. As a consequence, the speech circuit 6 for use in the telephone set is driven by a direct current supplied from the circuit L; The communication transformer 8 is connected between the dial pulse generator 5 on the line L1 and the terminal LN. As a consequence, the termination circuit 9 remains to be constantly connected to the circuit L via the communication transformer 8 at the time when the circuit is closed. The microphone 18 and the speaker 19 are incorporated in the handset 4. The microphone 18 is connected to the voice input terminal MIC of the speech circuit 6 for use in the telephone set while the speaker 19 is connected to the voice output terminal REC of the speech circuit 6 for use in the telephone set.

The photocoupler 20 controls the dial pulse generator 5 on the basis of a control signal from the system control circuit 2 to transmit the dial pulse (selection signal) to the circuit L. The dial pulse generator 5 is constituted by connecting in series, for example, transistors, namely switching devices to the line L1. The conduction and nonconduction of the switching transistors are controlled with the photocoupler 20 to cut off the direct current which flows through the circuit L thereby generating a dial pulse which is an interrupted current.

The photocoupler 21 controls a MIC MUTE terminal of the speech circuit 6 for use in the telephone set on the basis of a control signal from the system control circuit 2 so that an input signal from the microphone 18 is output via the terminal LN at the time of the voice communication while the input signal is prevented from being output at the time of the image signal communication.

The photocoupler 22 controls the voice output terminal REC of the speech circuit 6 for use in the telephone set on the basis of the control signal from the system control circuit 2 so that the signal of the circuit L is output from the speaker 19 at the time of the voice signal communication while the signal is prevented from being output at the time of the image signal communication.

Although the speech circuit 6 for use in the telephone set which circuit constitutes a circuit component as a telephone set is driven by a direct current supplied from the circuit L, the system control circuit 2 is driven by a different power source. Then, by using the photocoupler, the system control circuit 2 is capable of controlling the speech circuit 6 for use in the telephone set and controlling the validity and invalidity of the handset 4 in a state in which the system control circuit 2 is electrically isolated from the speech circuit 6 for use in the telephone set. Consequently, both the system control circuit 2 and the speech circuit 6 for use in the telephone set can be controlled without exerting an electric influence to each other thereby improving the reliability thereof.

Figure 3:
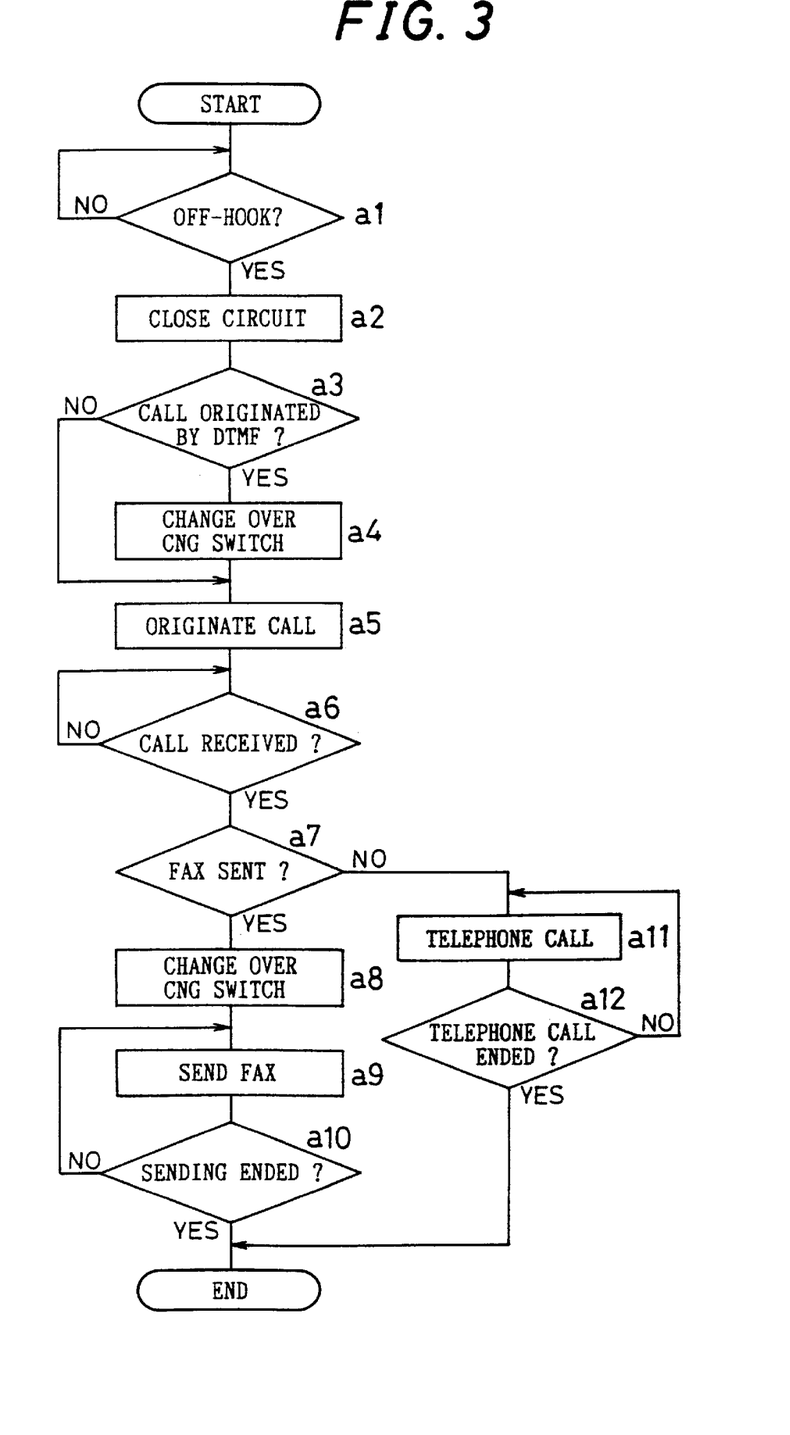
FIG. 3 is a flowchart for illustrating an operation of the communication apparatus 1 when the communication apparatus transmits a signal.

FIG. 3 is a flowchart for illustrating an operation of the communication apparatus 1 when the communication apparatus 1 transmits a signal. At step a1, it is judged whether or not the communication apparatus 1 is in the off-hook state. For example, when a hook-switch detector 16 detects that the handset 4 is picked up, when an on-hook key provided on the operation panel 7 is pressed, or when a start key is pressed which is provided on the operation panel 7 for designating the start of the facsimile communication, it is judged that the communication apparatus 1 is in the off-hook state; namely the communication apparatus 1 is in the state in which the apparatus 1 is about to start the communication (transmitting the signal). The on-hook key refers to a switch which is pressed when the call originating operation is carried out with the handset 4 being placed on the telephone set. Means for detecting such off-hook state corresponds to means for instructing the transmission of signals.

When the judgment is in the affirmative, the system control circuit 2 controls the circuit control circuit 3 and the dial pulse generator 5 to close a circuit loop at step a2. Specifically, the relay in the circuit control circuit 3 and the switching device in the pulse generator 5 are allowed to conduct electricity. When speech is designated, the photocouplers 20 and 21 are controlled to render effective the microphone 18 and the speaker 19.

At step a3, it is Judged whether or not the call is originated by using the DTMF signal, namely the start of transmitting the image signal is instructed. The judgment is passed on the basis of, for example, a call originating mode change-over switch provided on the operation panel 7. When the Judgment is in the affirmative, the CNG change-over switch 10 is changed over to connect the modem 1 to the circuit L via the communication transformer 8 at step a4.

When the processing at step a4 is ended, and at step a5 the time when the judgment at step a3 is in the negative, the call originating operation is carried out, specifically the selection signal corresponding to the telephone number of the addressed person in the communication is transmitted. As the selection signal the dial pulse from the dial pulse generator 5, or the DTMF signal from the modem 11 is transmitted depending on the dial key operation of the operation panel 7 by the user. Incidentally, even at the time of making a call by means of the DTMF signal using the modem 11, a dial tone can be confirmed with the handset 4 because the circuit is closed with the speech circuit 6 for use in the telephone set. When the judgment at step a3 is in the negative, an instruction is given to start transmitting the voice signal.

At step a6, it is judged whether or not a terminal on the side to which the telephone call is addressed has received the incoming call. The judgment is passed by detecting, for example, a polarity reversion of the circuit current. When the incoming call is detected, the process proceeds to step a7. At step a7, it is judged whether or not the communication is a facsimile communication. The judgment is passed on the basis of whether or not the document is set on the scanner 14 or not. When the judgment is in the affirmative, the process proceeds to step a8. On the other hand, when the judgment is in the negative, the process proceeds to step a11.

At step a8, the CNG change-over switch 10 is changed over to connect the modem 11 to the circuit L via the communication transformer 8. Incidentally, when the change-over switch 10 has been already changed over at step a4, the change-over switch 10 is not changed over at step a8. At step a9, the image signal is transmitted. At step a10, it is Judged whether or not the transmission has been ended. The Judgment is made by monitoring a protocol in the facsimile communication. Until the transmission operation is ended, the operations at step a9 and a10 are repeated. When the transmission operation is ended, the circuit control circuit 3 and the dial pulse generator 5 are controlled to open the circuit loop.

At step a11, speech communication through the handset 4 is made. At step a12, it is Judged whether or not the speech has been ended. The Judgment is passed on the basis of whether or not the handset 4 is placed in the cradle, namely whether or not the handset 4 is in the on-hook state. Until the speech communication is ended, the operations at steps a11 and a12 are repeated. When the speech is ended, the circuit control circuit 3 and the pulse dial generator 5 are controlled to open the circuit loop.

Figure 4:
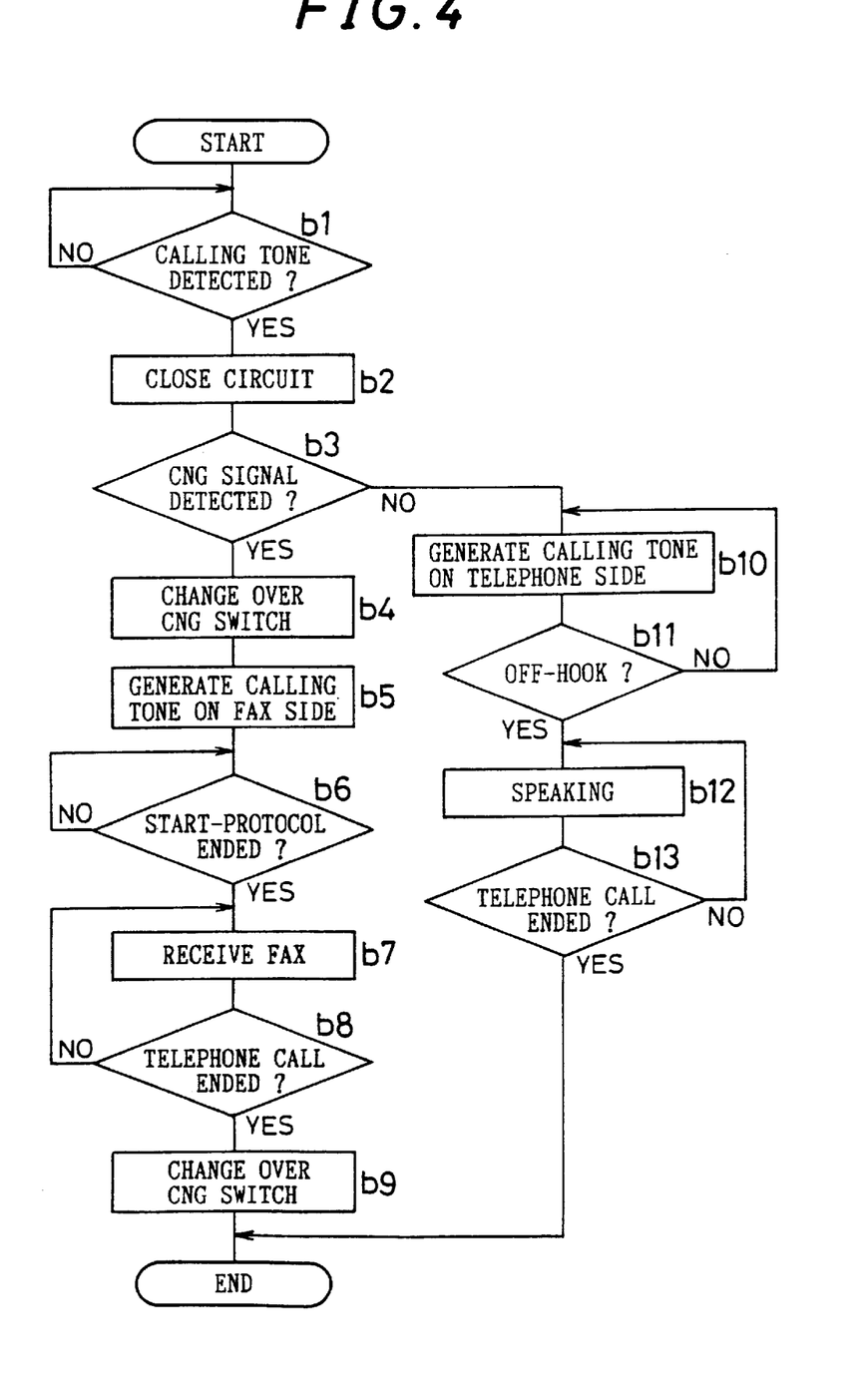
FIG. 4 is a flowchart for illustrating an operation of the communication apparatus 1 when the communication apparatus 1 receives a signal.

FIG. 4 is a flowchart for illustrating an operation of the communication apparatus 1 when the communication apparatus receives the signal. At step b1, it is judged whether or not the calling signal has been detected. The judgment on the detection of the calling signal is passed on the basis of the detection signal from the ringing detector 15. When the judgment is in the affirmative, the process proceeds to step b2 thereby controlling the circuit control circuit 3 and the dial pulse generator 5 to close the circuit loop. At step b3, it is judged whether or not the CNG signal has been detected. When the judgment is in the affirmative, the process proceeds to step b4 to carry out the facsimile communication. When the judgment is in the negative, the process proceeds to step b10 to speak.

At step b4, the CNG change-over switch 10 is changed over to connect the modem 11 to the circuit L via the communication transformer 8. At step b5, the speaker 17 generates a predetermined calling tone. This is to notify users of the receipt of the facsimile communication.

At step b6, it is judged whether or not the start protocol in the facsimile communication sequence has been ended. When the judgment is in the affirmative, the process proceeds to step b7 thereby receiving the image signal. At step b8, it is judged whether or not the facsimile communication has been ended. Until the end of the facsimile communication is detected, the operations at step b7 and b8 are repeated. When the end of the facsimile communication has been detected, the process proceeds to step b9 to change over the change-over switch 10 thereby connecting the modem 11 to the circuit L via the CNG detector 12 thereby controlling the circuit control circuit 3 and the dial pulse generator 5 to open the circuit loop.

At step b10, the speaker 17 generates a predetermined calling tone. This is to notify the user that the voice communication has been received, and a speech is requested. Incidentally, the calling tone may the same as the calling tone which is output at step b5. However, when a different calling tone is used, the user can determine from the calling tone whether the communication is for facsimile communication or a speech, and which is very convenient for the user.

At step b11, it is Judged whether or not the handset 4 is in the off-hook state. This judgment is passed on the basis of a detection signal from the hook-switch detector 16. When the user picks up the handset 4, the off-hook state is generated. Until the on-hook state is generated, the operations at steps b10 and b11 are repeated. When the on-hook state is detected, the process proceeds to step b13 to speak via the handset 4.

At step b 13, it is judged whether or not the speech has been ended. This judgment is passed on the basis of the detection signal from the hook-switch detector 16. Until the end of the communication is detected, the operations at steps b12 and b13 are repeated. At the time when the user places the handset 4 and the on-hook state is generated, it is Judged that the speech has been ended. When the speech is ended, the circuit control circuit and the dial pulse generator 5 are controlled to open the circuit loop.

As described above, according to the embodiment of the invention, circuits which are conventionally provided in an overlapping manner, such as, for example, the circuit control circuit, the dial call originating circuit, the calling signal detector, the direct current superimposing circuit, and the termination circuit are provided in one set so that such circuits are commonly used at the time of the voice communication and the facsimile communication. Consequently, the number of parts are reduced, the cost thereof is reduced, and the size of the apparatus can be reduced along with the reduction of the size of the circuit substrate.

Furthermore, when a phone-answering function is added, only the modem and the system control circuit may be changed. For example, when a modem attached with a phone-answering function Is used as the modem, the cost is not increased with respect to the circuit interface part and the development time can be shortened because the circuit component of the telephone set can be used as it is.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A communication apparatus using a telephone line for selectively transmitting and receiving a voice signal and an image signal via the telephone line, the communication apparatus comprising:

circuit control means for closing and opening the telephone line;

voice signal communication means connected to the circuit control means, for transmitting and receiving a voice via the telephone line, the voice signal communication means includes a line length compensating circuit;

image signal communications means connected to the circuit control means, for transmitting and receiving an image signal via the telephone line;

a termination resistor connected between the image signal communications means and the circuit control means, which said termination resistor servers as a termination for both the voice communication means and the image signal communication means;

transmission instruction means for instructing a start of transmitting either the voice signal originated from the voice signal communications device or the image signal originated from the image signal communications device;

a controller which responds to an output of the transmission instruction means, and controls the circuit control means to close the telephone line and isolate the image signal communication means from the termination resistor, when an instruction to start transmitting the voice signal is given, or to close the telephone line and isolate the voice signal communication means, when an instruction to start transmitting the image signal from the voice signal communications device is given.

2. The communication apparatus using a telephone line of claim 1, wherein a dial pulse generating means for generating a dial pulse is connected to the circuit control means.

3. The communication apparatus using a telephone line of claim 1, the apparatus further comprising:

calling signal detecting means connected to the circuit control means, for detecting a calling signal from the exchanger, and calling tone generating means for generating a predetermined calling tone, wherein the controller drives the calling tone generating means in response to a detection signal of the calling signal detecting means to generate the calling tone.

4. The communication apparatus using a telephone line of claim 1, wherein the isolation of the image signal communication means and the voice signal communication means from the telephone line is conducted by using photocoupling means.

5. The communication apparatus using a telephone line of claim 4, the communication apparatus further comprising a microphone for converting a voice into a voice signal to output the signal to the telephone line, a speaker for converting the voice signal from the telephone line into a voice, and photocoupling means for connecting the microphone and the speaker to the telephone line or isolating the microphone and the speaker from the telephone line, wherein the voice signal communication means is driven by using a direct current supplied from the telephone line as a power source; and the controller controls the conduction and nonconduction of the photocoupling means.

6. A communication apparatus using a telephone line for selectively transmitting and receiving a voice signal and an image signal via the telephone line, the communication apparatus comprising:

a control circuit which selectively opens and closes the telephone line;

at least one voice signal communications device connected to the control circuit, said voice signal communications device being operable to transmit and receive a voice signal via the telephone line, the voice signal communications device including a line length compensating circuit;

at least one image signal communications device connected to the control circuit, said image signal communications device being operable to transmit and receive an image signal via the telephone line;

a termination resistor connected between the image signal communications device and the control circuit, which said termination resistor servers as a termination for both the voice communication means and the image signal communication means;

a transmission instruction circuit operable to instruct a transmission start for either the voice signal originated from the voice signal communications device or the image signal originated from the image signal communications device;

a controller which responds to an output of the transmission instruction circuit, and causes the control circuit to close the telephone line and isolate the image signal communications device from the termination resistor when an instruction is given to start transmitting the voice signal from the voice signal communications device, or to close the telephone line and isolate the voice signal communications device when an instruction is given to start transmitting the image signal from the image signal communications device.

7. The communication apparatus using a telephone line of claim 6, wherein a circuit which generates a dial pulse is connected to the control circuit.

8. The communication apparatus using a telephone line of claim 6, the apparatus further comprising:
   a calling signal detector connected to the control circuit, said calling signal detector being operable to detect a calling signal from the exchanger, and
   a calling tone generator operable to produce a predetermined calling tone,
   wherein the controller drives the calling tone generator in response to a detection signal of the calling signal detector to generate the calling tone.

9. The communication apparatus using a telephone line of claim 6, wherein the isolation of the image signal communications device and the voice signal communications device from the telephone line is conducted by using a photocoupler.

10. The communication apparatus using a telephone line of claim 9, the communication apparatus further comprising a microphone which converts a voice into a voice signal to output the signal to the telephone line, a speaker which converts the voice signal from the telephone line into a voice, and a photocoupler which selectively converts the microphone and the speaker to the telephone line or isolates the microphone and the speaker from the telephone line,
   wherein the voice signal communications device is driven by using a direct current supplied from the telephone line as a power source; and
   the controller controls the conduction and nonconduction of the photocoupler.

11. The communication apparatus using a telephone line of claim 6, wherein the voice signal communications device is operable to transmit and receive a voice signal via the telephone line via a telephone handset; and wherein at a time when the image signal communication device makes a call using DTMF signaling, presence of a dial tone can be confirmed with the handset because the circuit is closed with the voice signal communications device.

12. A communication apparatus using a telephone line for selectively transmitting and receiving a voice signal and an image signal via the telephone line, the communication apparatus comprising:
   a control circuit which selectively opens and closes the telephone line;
   a voice signal communications device connected to the control circuit, said voice signal communications device being operable to transmit and receive a voice signal via the telephone line;
   an image signal communications device connected to the control circuit, said image signal communications device being operable to transmit and receive an image signal via the telephone line;
   a termination circuit which serves as a termination for both the voice signal communications device and the image signal communications device, the termination circuit being connected to the telephone line;
   a CNG detector connected to the telephone line;
   a controller;
   a change-over switch which selectively connects the image signal communications device to one of the CNG detector and the termination circuit;
   wherein the controller operates the change-over switch so that the image signal communications device is connected to the termination circuit and thus to the telephone line upon detection of the presence of one of (1) a CNG signal on the telephone line, and (2) start of an image transmission;
   wherein the controller isolates a microphone and a speaker of the voice signal communications device upon detection of the presence of one of (1) a CNG signal on the telephone line, and (2) start of an image transmission.

13. The communication apparatus using a telephone line of claim 12, wherein the termination circuit comprises a termination resistor.

14. The communication apparatus using a telephone line of claim 12, wherein the voice signal communications device uses direct current supplied by the telephone line; and wherein the controller is driven by a power source other than the telephone line.

15. The communication apparatus using a telephone line of claim 13, wherein the controller isolates the microphone and the speaker of the voice signal communications device without exerting an electrical influence on the voice signal communications device.

16. The communication apparatus using a telephone line of claim 15, further comprising a photocoupler which is operated by the controller to selectively activate and deactivate at least one of the microphone and the speaker of the voice signal communications device.

17. The communication apparatus using a telephone line of claim 12, wherein the voice signal communications device includes a line length compensating circuit; and
   the image signal communications device is connected to the control circuit via the termination circuit; and
   the controller isolates the image signal communications device from the termination circuit when an instruction to start transmitting the voice signal is given.

18. The communication apparatus using a telephone line of claim 12, wherein a circuit which generates a dial pulse is connected to the control circuit.

19. The communication apparatus using a telephone line of claim 12, the apparatus further comprising:
   a calling signal detector connected to the control circuit, said calling signal detector being operable to detect a calling signal from the exchanger, and
   a calling tone generator operable to produce a predetermined calling tone,
   wherein the controller drives the calling tone generator in response to a detection signal of the calling signal detector to generate the calling tone.

20. The communication apparatus using a telephone line of claim 12, wherein the isolation of the image signal communications device and the voice signal communications device from the telephone line is conducted by using a photocoupler.

21. A communication apparatus using a telephone line for selectively transmitting and receiving a voice signal and an image signal via the telephone line, the communication apparatus comprising:

a voice signal communications device selectively connected to the telephone line, said voice signal communications device being operable to transmit and receive a voice signal via the telephone line, said voice signal using direct current supplied from the telephone line;

an image signal communications device selectively connected to the telephone line, said image signal communications device being operable to transmit and receive an image signal via the telephone line;

a termination circuit which serves as a termination for both the voice signal communications device and the image signal communications device, the termination circuit being connected to the telephone line;

a controller which operates on a different power source than the voice signal communications device, wherein when image signal communications occurs the controller generates (1) signals to connect the image signal communications device to the telephone line via the termination circuit; and (2) signals to isolate an element of the voice signal communications device from the telephone line.

22. The communication apparatus using a telephone line of claim 21, wherein isolation of the element of the voice signal communications device is accomplished without electrically influencing the voice signal communications device.

23. The communication apparatus using a telephone line of claim 21, further comprising a change-over switch which is operated by the controller to connect the image signal communications device to the telephone line via the termination circuit.

24. The communication apparatus using a telephone line of claim 21, further comprising a control circuit which selectively opens and closes the telephone line; wherein the voice signal communications device is connected to the control circuit; and wherein the image signal communications device is connected to the control circuit.

25. The communication apparatus using a telephone line of claim 24, wherein a circuit which generates a dial pulse is connected to the control circuit.

26. The communication apparatus using a telephone line of claim 24, the apparatus further comprising:

a calling signal detector connected to the control circuit, said calling signal detector being operable to detect a calling signal from an exchanger, and a calling tone generator operable to produce a predetermined calling tone, wherein the controller drives the calling tone generator in response to a detection signal of the calling signal detector to generate the calling tone.

27. The communication apparatus using a telephone line of claim 21, the communication apparatus further comprising a microphone which converts a voice into a voice signal to output the signal to the telephone line, a speaker which converts the voice signal from the telephone line into a voice, and a photocoupler which selectively converts the microphone and the speaker to the telephone line or isolates the microphone and the speaker from the telephone line, and the controller controls the conduction and nonconduction of the photocoupler.

28. The communication apparatus using a telephone line of claim 21, wherein the voice signal communications device includes a line length compensating circuit.

29. The communication apparatus using a telephone line of claim 21, wherein the voice signal communications device is operable to transmit and receive a voice signal via the telephone line via a telephone handset; and wherein at a time when the image signal communication device makes a call using DTMF signaling, presence of a dial tone can be confirmed with the handset because the circuit is closed with the voice signal communications device.

30. A communication apparatus using a telephone line for selectively transmitting and receiving a voice signal and an image signal via the telephone line, the communication apparatus comprising:

a control circuit which selectively opens and closes the telephone line;

at least one voice signal communications device connected to the control circuit, said voice signal communications device being operable to transmit and receive a voice signal via the telephone line via a telephone handset;

at least one image signal communications device connected to the control circuit, said image signal communications device being operable to transmit and receive an image signal via the telephone line, a termination circuit connected between said image signal communication device and said control circuit, which said termination circuit servers as a termination for both the voice communication means and the image signal communication means;

a controller which, at a time when the image signal communication device makes a call using DTMF signaling, keeps the handset connected to the telephone line whereby the handset can be utilized to confirm presence of a dial tone, and which when an instruction is given to start transmitting the image signal from the image signal communications device, isolates the voice signal communications device from the telephone line.

31. The communication apparatus using a telephone line of claim 30, wherein the controller isolates the image signal communications device when an instruction is given to start transmitting the voice signal from the voice signal communications device, isolates the voice signal communications device from the telephone line.

* * * * *